(12) United States Patent  (10) Patent No.: US 6,349,593 B1
Blair  (45) Date of Patent: Feb. 26, 2002

(54) TIRE MOUNTING DEVICE

(76) Inventor: Scott F. Blair, 140 Hope Dr., Daphne, AL (US) 36526

( * ) Notice: Subject to any disclaimer, the term of this patent is extended or adjusted under 35 U.S.C. 154(b) by 0 days.

(21) Appl. No.: 09/566,300

(22) Filed: May 5, 2000

Related U.S. Application Data

(60) Provisional application No. 60/136,496, filed on May 28, 1999.

(51) Int. Cl.⁷ .............................................. G01D 21/00
(52) U.S. Cl. .............................. 73/146; 33/288; 33/337; 33/203.18
(58) Field of Search ............................... 73/146; 33/286, 33/288, 335, 336, 337, 193, 203, 203.18

(56) References Cited

U.S. PATENT DOCUMENTS

| 3,188,747 | A | * | 6/1965 | Race | |
| 4,363,175 | A | * | 12/1982 | Hedahl | 33/288 |
| 4,377,038 | A | * | 3/1983 | Ragan | 33/203.18 |
| 4,407,073 | A | * | 10/1983 | Nilsson et al. | 33/203.18 |
| 4,453,315 | A | * | 6/1984 | Mosiman et al. | 33/203.18 |
| 4,953,307 | A | * | 9/1990 | Loucas | 33/203 |
| 5,044,090 | A | * | 9/1991 | Hunter | 33/203.18 |
| 5,313,828 | A | * | 5/1994 | Kotzle et al. | 73/146 |
| 5,369,602 | A | * | 11/1994 | Naas et al. | 33/203.18 |
| 5,384,965 | A | * | 1/1995 | Schneck | 33/203 |
| 5,398,419 | A | * | 3/1995 | Schmidt, Jr. et al. | 33/203.18 |
| 5,471,754 | A | * | 12/1995 | Mieling | 33/203.18 |
| 5,625,953 | A | * | 5/1997 | Healy et al. | 33/203.18 |
| 6,018,879 | A | * | 2/2000 | Carder | 33/203.18 |
| 6,035,729 | A | * | 3/2000 | Weinmann | 73/146 |

OTHER PUBLICATIONS

Adviertisement, Primax Wheel Corp. no date.*

* cited by examiner

Primary Examiner—Eric S. McCall

(57) ABSTRACT

The disclosure shows a face plate or main plate for mounting to a tire axle with arms extending outward to hold a tire positioned where a rim would otherwise hold the tire so that the user may determine if the tire and rim will work with the vehicle wheel well. Expanding arms with grips on either side for holding opposite sides of the tire bead are described so that the tire may be held in an expanded position. All of the parts are interchangeable or expandable to allow a plurality of tires or lug bolt patterns to be accommodated. A process for using the device is also taught.

17 Claims, 15 Drawing Sheets

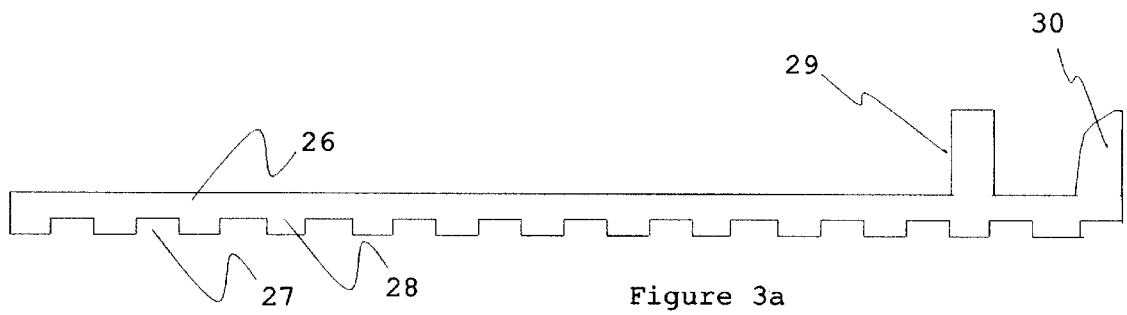
Figure 3a
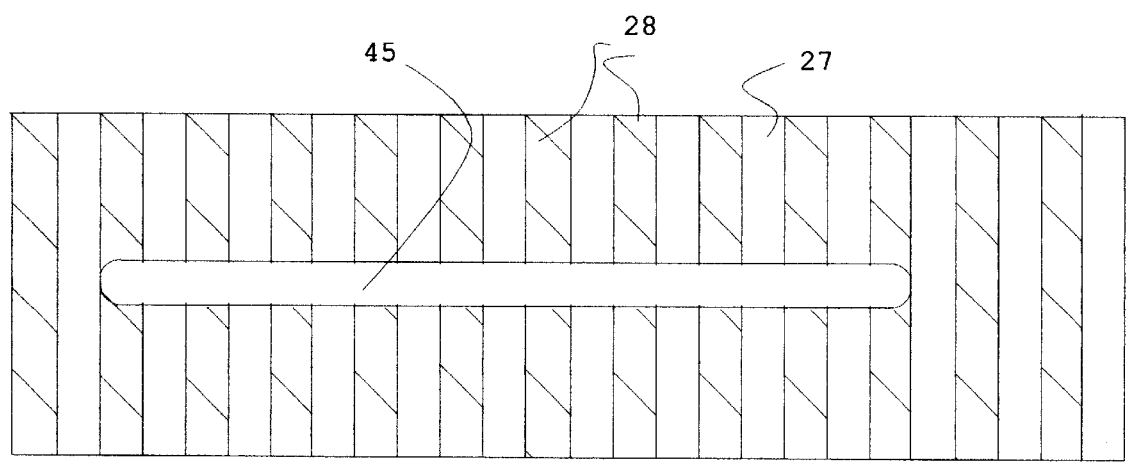
Figure 3b
Figure 3c
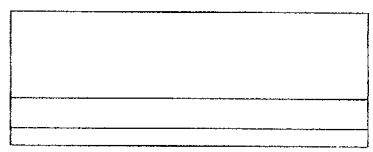

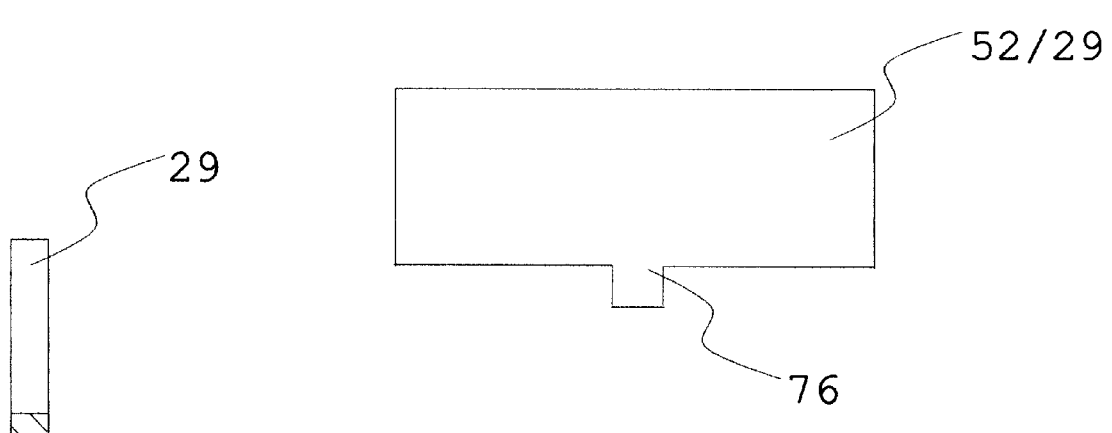
Figure 15a
Figure 15b
Figure 15c

TIRE MOUNTING DEVICE

PRIORITY

This patent is a continuation of Provisional Patent: 60/136,496 filed May 28$^{th}$, 1999.

BACKGROUND OF INVENTION

1. Field of Invention

This invention pertains to devices for sizing specific tires and rims to specific vehicles.

2. Prior Art

There exists a rim offset gauge patented in 1990 by Theodore Loucus (U.S. Pat. No. 4,953,307) that supposedly measures fender well clearance and indicates the proper offset needed for a wheel to fit a particular vehicle. However, this tool does not hold an actual tire to accurately determine fitment, which is the most critical aspect of the Tire Mounting Device. Loucus' tool will only extend vertically approximately 16$^{th}$ to measure a maximum tire size of approximately 33" overall diameter. It doesn't have the ability to hold and measure taller tires. The Loucus tool relies on the idea that a tire has a fixed width. It suggests that you mount a real tire on a rim that is the same width that you want to use, inflate it and determine how wide it is. This amount of work reduces the effectiveness of the patented tool. The same tire will measure differently on different width wheels. Even tire manufacturers indicate a tires section width (how wide it is) based on mounting it on a given wheel width. It also fails to utilize actual tires.

The present invention will stretch or compress the sidewalls of an actual tire to give an accurate indication of how wide a tire will be once inflated on a wheel.

GENERAL DISCUSSION OF THE INVENTION

These and other objects and advantages of the invention will become better understood hereinafter from a consideration of the specification with reference to the accompanying drawings forming part thereof, and in which like numerals correspond to parts throughout the several views of the invention.

The name "Tire Mounting Device" may be manufactured from steel or aluminum.

It is produced for the automotive industry, specifically automotive tire and wheel retailers.

The Tire Mounting Device shown in the present patent will physically grasp and hold any tire (within its dimensional limitations) up to, but not limited to, 48" tall light truck tires. The Tire Mounting Device will provide a means to test fit wheels on automobiles, vans, trucks and heavy trucks such as dump trucks.

The Tire Mounting Device is a tool to determine if the offset and backside setting of a given wheel mounted with a tire will fit a vehicle. It does this by having a vertical extension that can be extended to represent a 14"–20" diameter wheel. Two overlapped sliding horizontal extensions are bolted perpendicular to the vertical extension. One horizontal extension is 6.25" in length, the other is 12" in length. This allows the Tire Mounting Device to represent a 7"–16" wide wheel. It can hold a tire to see if it fits. Also, the two horizontal extensions have teeth on top of the bottom extension that interlock with a tooth on the bottom of the top extension to secure the tool so that it doesn't slide when a tire is in its grasp. The two horizontal extensions each have a groove cut down the center so they can pivot and slide using a bolt with a washer and wingnut protruding through an angled piece of metal (vertical extension) that connects at the other end to the face plate. This angled piece of metal has notches on each side of the top that the bottom horizontal extension fits into by means of a matching channel. This is a dramatic improvement over the prior art, because the Tire Mounting Device is thereby more versatile and allows for greater accuracy in determining if a tire or wheel will fit properly.

The Tire Mounting Device is a simple tool that anyone can use to determine proper wheel and tire fitment.

The Tire Mounting Device is a tool designed to eliminate the need to test wheels on vehicles. The Tire Mounting Device will be used in place of an actual wheel to determine if a specific wheel and tire combination will fit on a particular vehicle. There are many advantages to using the Tire Mounting Device instead of an actual wheel. It can replicate any wheel from 14"×7" to 20"×16". To understand how the Tire Mounting Device works it is helpful to understand a few technical aspects of measuring a wheel. First, you have the diameter and then the width of the wheel. The centerline is the exact center of the wheel's width. The mounting pad is the surface of the wheel that actually contacts the vehicle. The relative position of the mounting pad to the centerline is referred to as offset. It is measured in a positive or negative millimeter measurement from the centerline. If the mounting pad is forward (street side) of the centerline, it is positive offset. If the mounting pad is behind the centerline, it is negative offset.

Every wheel has different measurements; Therefore, a wide range of settings is possible.

Trying to determine if a specific wheel will fit a particular vehicle is a difficult job, especially when the wheel is not readily available. The purpose of the Tire Mounting Device is to allow a tire/wheel dealer to adjust the Tire Mounting Device to the specific measurements of the wheel that a customer wants. The dealer can test fit any wheel to a vehicle without the actual wheel. This will eliminate unnecessary freight costs and the risk of damaging an expensive custom wheel while trying to make it fit on the vehicle.

The Tire Mounting Device is critical in today's custom wheel market. The larger the diameter, the more difficult the task of fitting custom wheels. Adding to this problem is determining what size tire to use. The number of tire sizes is growing by 10% per year, especially in the high performance and light truck market. The Tire Mounting Device will allow for tire dealers to test fit a specific tire to a particular vehicle as well. By combining these two uses, the Tire Mounting Device can revolutionize the aftermarket custom wheel industry. No longer will tire/wheel distributors have to risk loaning a wheel or tire to a tire/wheel dealer. No longer will costly mistakes and accidents in the shop have to occur. The dealer will simply take the measurements of the wheel that the customer wants, select from a group of tires that seems reasonable to use and test fit the application while the customer is in the shop and can witness the results. The tire/wheel dealer and the customer can then be confident that the selected tire and wheel will fit properly.

The "Tire Mounting Device" addresses a common problem in the passenger/light truck industry. That problem is the application of non-OEM tires and wheels to specific vehicles. At the present, there is no way to determine if a specific wheel, tire or combination of the two will work on a particular vehicle without test fitting first. This usually entails mounting a wheel on the vehicle, turning the front wheels from left to right and "eyeballing" the results. The next step is to mount a tire on the wheel and repeat the test fit process. In doing so, there are many problems that arise from this situation. They are:

1. The wheel distributor doesn't care to offer a new wheel for test fit because once mounted it becomes difficult to sell.
2. Most automotive retailers are not careful and tend to damage items easily. If they cause damage, they are not willing to purchase the tire or wheel because they cannot make any money. They want to use the wheel and tire free of charge and return them with no responsibility toward ownership unless it fits properly and the customer wants the tire and wheel.
3. Even careful retailers can have accidents causing damage while mounting tires and wheels thus leading to problems returning the tire or wheel. This also leads to problems when trying to sell a damaged wheel to a customer.

The Tire Mounting Device would eliminate the guesswork and trial by allowing the retailer to adjust the Tire Mounting Device to the precise measurements of the wheel and grasp and hold the tire that is needed for the test fit.

The Tire Mounting Device eliminates the chance that a retailer might damage a new wheel. In today's market high end chrome plated wheels are the most expensive. Larger wheels are more expensive and typically difficult to fit because of their size. Damaging just one rim can cost hundreds of dollars. In contrast, the Tire Mounting Device can be less than a single tire, particularly if made of plastics or resins. Also avoiding the cost of damaging just one wheel may pay for the Tire Mounting Device.

These are several methods of practicing the invention. A rotor would have the tool mounted to it. Also, the vertical slide extension was sketched. Wing nuts and two slide horizontal extensions where one slides within the other allows for different tire widths.

One embodiment might allow a single faceplate to fit any vehicle, regardless of the bolt pattern or relative placement of lug studs to each other. This design did not take into consideration the fact that the front hubs of vehicles have grease caps that would not allow the tool to bolt to the rotor. This version allowed the tool to hold a tire that was wider than the rim width but didn't allow for narrow tires to be held for test fit.

The vertical extension was designed to be cut with a groove in the center to allow it to slide up and down to the desired height. Alternatively, a series of punched holes may allow two bolts to secure two vertical extensions 43. Next, a 'T' shape was formed at the top of the vertical slide extension to allow for mounting to the two horizontal slide extensions or may also be a 90 degree bend 60 in the vertical extension to allow a bolt 35 to secure the two horizontal extensions 26 and 56. The ends 51 and 30 of the two horizontal slide extensions are curved outward to hold the tire bead in place when test fitting. The two horizontal slide extensions are independent of each other and allow for a wide range of possible settings.

The face plates in the preferred embodiment do not cover all. Openings, center bore hole 2, allow the center bore or grease cap of a vehicle (not shown) to protrude through the faceplate 1 without interference. The faceplate allows for 4 or 5 lug applications with different center bore sizes typically using different plates for large or small bore sized. The thickness of the faceplate is preferably less than 0.50" thick. Also, the ¼" punched holes at the top and bottom of each face plate were spaced 2" apart. This was later changed to 1.25" to eliminate excess material from being needed to produce the vertical extensions.

The initial holes shown, for example, in FIGS. 1 as 3a, 3b, 6, 7, 8, 9, 10, 11, 12 and 13 for the lug bolts may be punched independently of the center bore hole 2 but are preferably connected to the center bore hole 2 to allow greater flexibility and easier production of the tool.

FIG. 2 is a scale drawing of the faceplate with the small center bore. Angles and holes are marked to indicate position.

The faceplate may be shown bolted to the vertical extension with a bolt and nut. The vertical extension may have the 90 degree angle and bolt connecting the vertical extension to the two horizontal extensions. The lower horizontal extension is 12" in length compared to 6.5" for the upper horizontal extension. The additional length (12") was needed to allow the tool to extend further. Wide wheels such as on Corvettes, Vipers or 4×4 trucks would use wheels of this width, so the tool has to be able to adjust to accommodate these dimensions.

If the tire is wider than the rim vertical lips are not necessary. These are necessary if the tire is narrower than the rim. A small vertical lip (bead clamp) may be added to each horizontal slide. This vertical lip will stretch a narrow tire out so that an accurate test fit can be performed where the tire is not wider than the rim. Both horizontal extensions 26 and 31 have ruler marks engraved on the sides to allow for accurate alignment with the vertical extensions 43 and 44 for the purpose of determining the back side setting. The ruler marks start at the outside edge of the clamping end 30 and 51 with 0" and run the length of the horizontal extension in increments of ¼".

The two bead clamps are adjustable from approximately 0.55" to 0.80" from the outer flange. This distance is approximated. It is needed due to the fact that tire beads (where the tire meets the wheel) have various thickness.

The notch at the bottom is provided so the vertical extension would not hit the lug studs when at its smallest diameter settings (14" and 15"). The notch allows the tool to retract to its minimum length. There are two horizontal extensions. A tooth on the bottom of the upper horizontal extension fits into the groove on top of the bottom horizontal extension. The grooves are preferably a discrete distance (here 0.50") apart because rim diameters are in discrete increments, i.e., 6", 6.5", 7", 7.5", etc.

BRIEF DESCRIPTION OF DRAWINGS

For a further understanding of the nature and objects of the present invention, reference should be made to the following detailed description taken in conjunction with the accompanying drawings in which like parts are given like reference numerals and wherein:

FIG. 1 is a scale drawing of the faceplate with the large center bore. Angles and holes are marked to indicate position.

FIG. 1a is a top view of one of two face places used in the preferred embodiment.

FIG. 1b is a side view of the face plate shown in FIG. 1a.

FIG. 2a is a top view of a second face plate.

FIG. 2b is a side view of the face plate shown in FIG. 2a.

FIG. 3a is a side view of a top half horizontal extension.

FIG. 3b is a top view of the top half horizontal extension in FIG. 3a.

FIG. 3c is an end view of the top half horizontal extension of FIG. 3a.

FIG. 5b is a top view of the bottom half horizontal extension shown in FIG. 5a.

FIG. 5c is an end view of the bottom half horizontal extension shown in FIG. 5a.

FIG. 6b is a top view of the vehicle extension of FIG. 6a.

FIG. 9b shows a side view cross section of FIG. 9a.

FIG. 10a shows an alternate embodiment of the second of three face plates.

FIG. 10b shows a side view cross section of FIG. 10a.

FIG. 11a shows an alternate embodiment of the third of three face plates.

FIG. 11b shows a side view cross section of FIG. 11a.

FIG. 12a shows a side view of an alternate embodiment of the extension shown in FIG. 8 which is an alternate of 5a.

FIG. 12b shows a top view of the part shown in FIG. 12a.

FIG. 12c shows an end view of FIG. 12a.

FIG. 13a shows a front view of the vertical extension plate in the alternate embodiment.

FIG. 13b shows a top view of FIG. 13a.

FIG. 13c shows a side view of FIG. 13a.

FIG. 14a shows an alternate embodiment of FIG. 3a designed to work with the embodiments shown in FIGS. 8 and 5a.

FIG. 14b shows a bottom view of FIG. 14a.

FIG. 14c shows an end view of FIG. 14a.

FIG. 15a shows a removable inside tire grip such that will protrude through holes 27 and 50 of FIGS. 12 and 14, respectively as item 29 and 52.

FIG. 15b shows a front view of FIG. 15a.

FIG. 15c shows a bottom view of FIG. 15a.

DETAILED DESCRIPTION OF THE PREFERRED EXEMPLARY EMBODIMENTS

Figure 4:
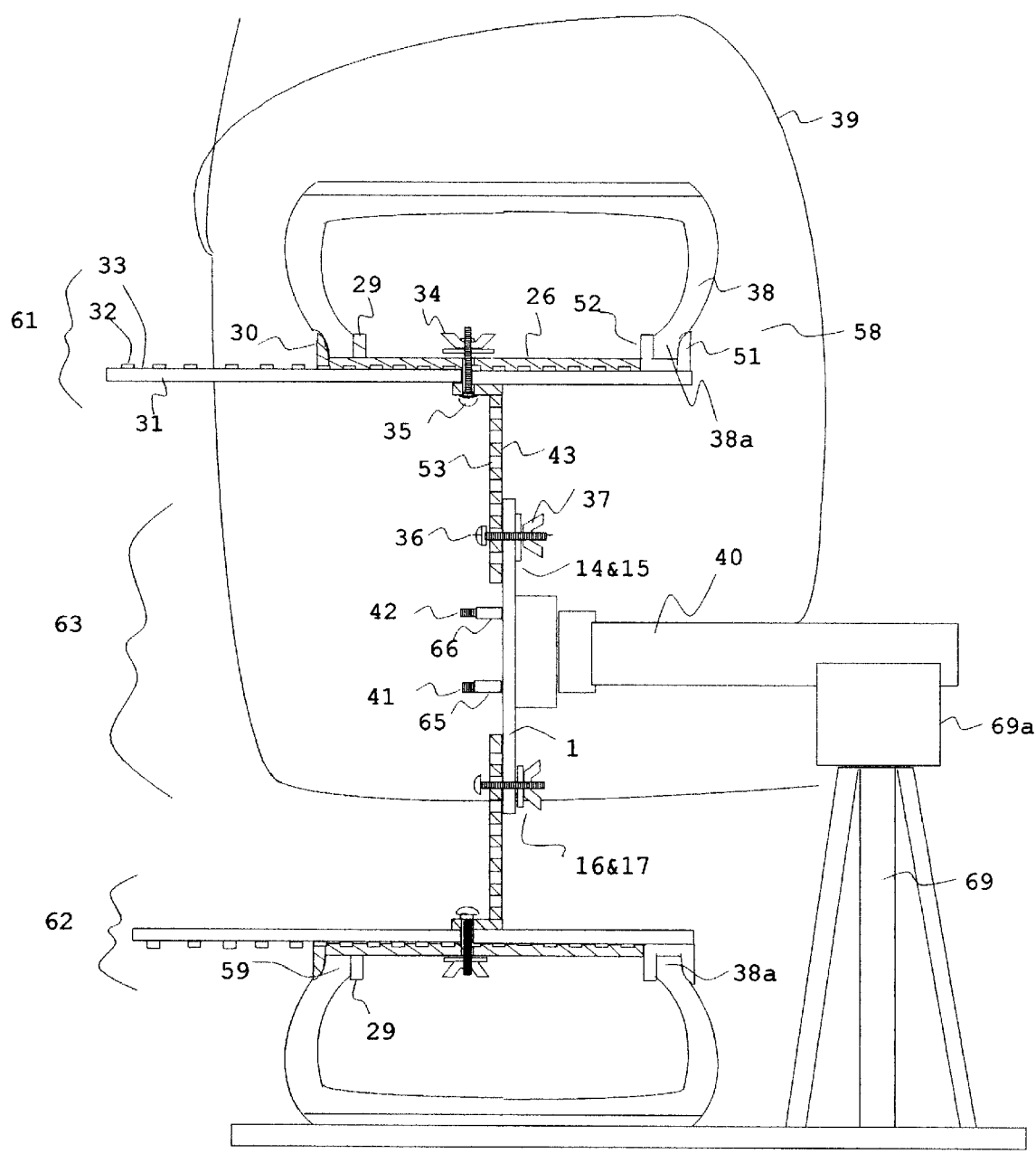
FIG. 4 shows the assembled product fitted onto a axle hub with a tire in cross section.
Figure 5A:
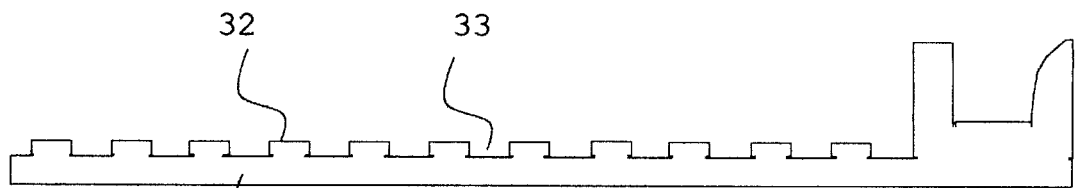
FIG. 5a is a side view of the bottom half horizontal extension.
Figure 5B:
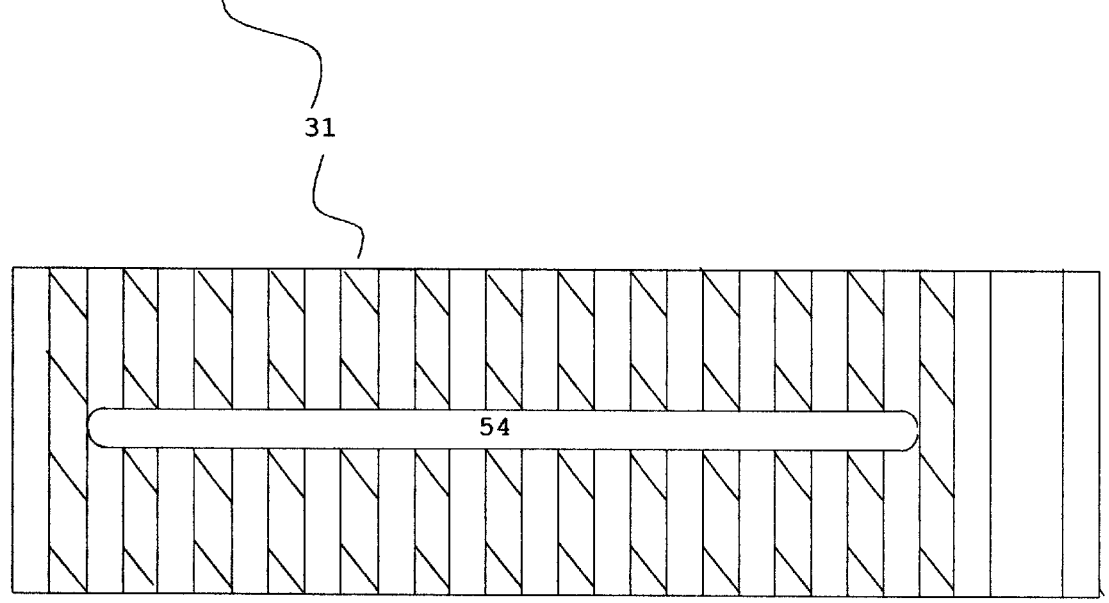
Figure 5C:
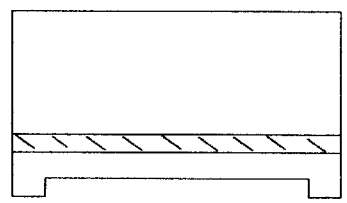
Figure 6A:
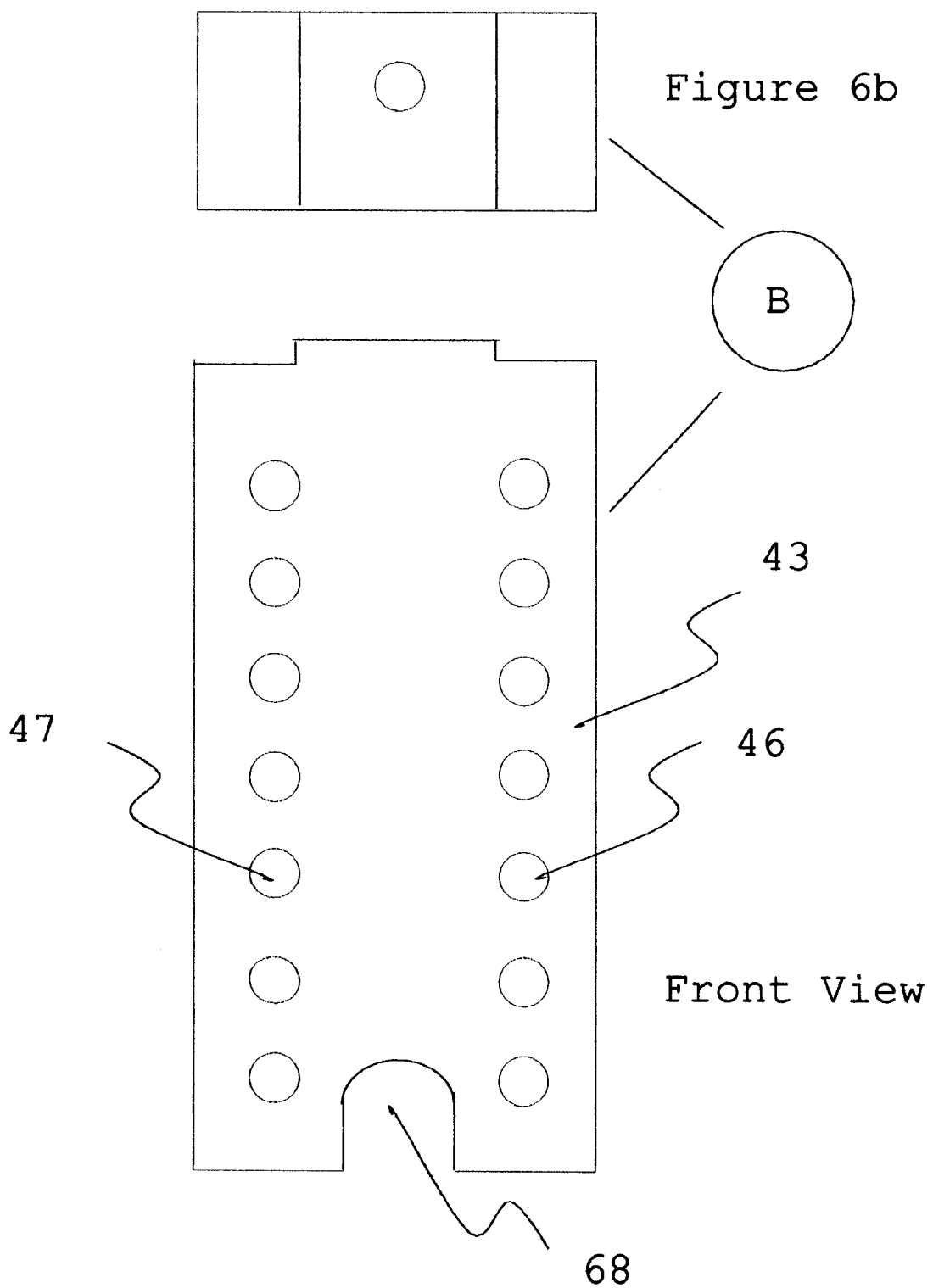
FIG. 6a is a front view of a vertical extension with holes punched.
Figure 7:
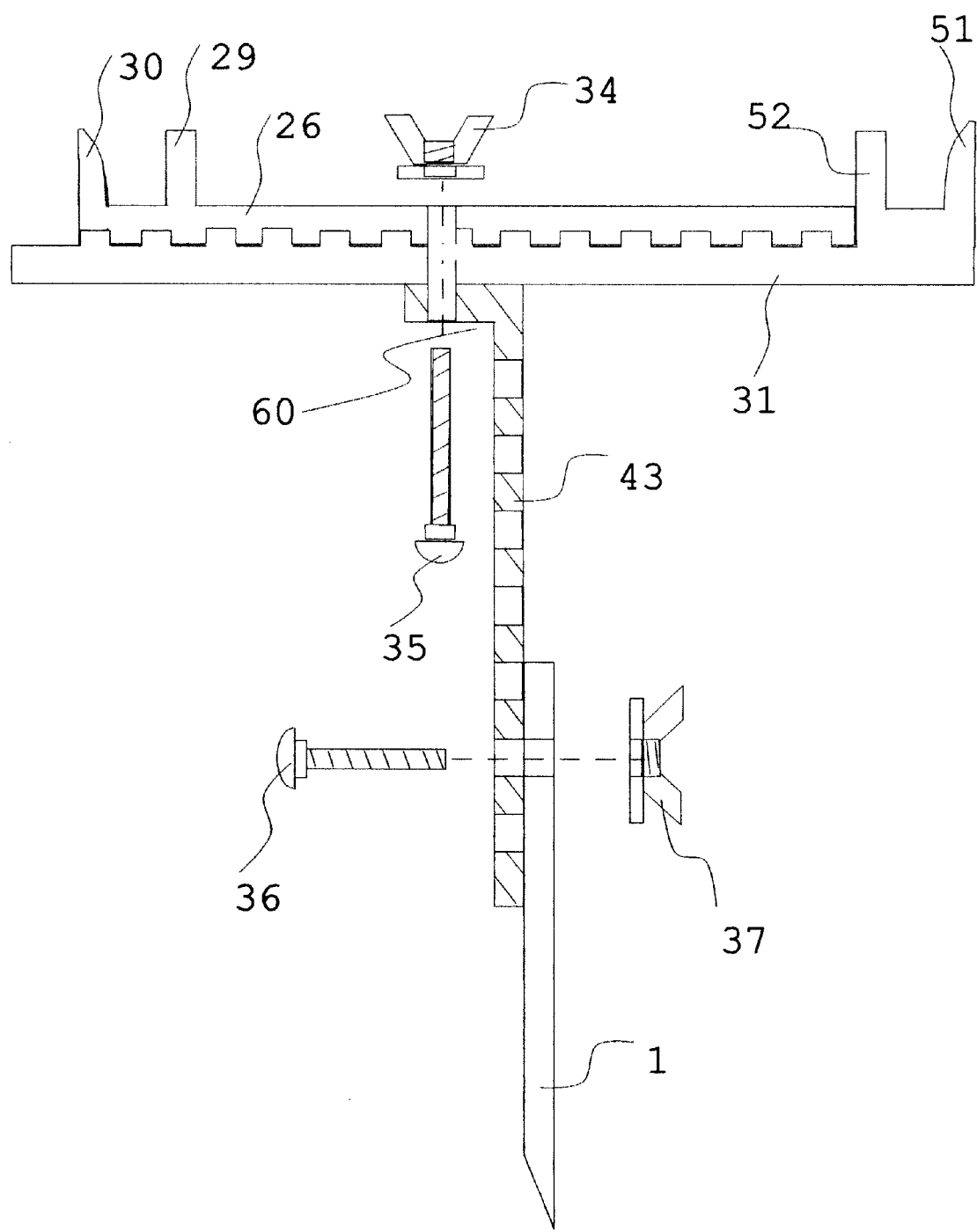
FIG. 7 is a detail of the top tire holding assembly of FIG. 4.

As can best be seen by reference to FIG. 4 the invention is designed to fit on an axle 40 of a vehicle having a tire well 39. The device is designed hold a tire 38 having a tire bead 38a between inside tire grip 29 and outside tire grip 30 on one side and inside tire grip II 52 and outside tire grip II 51 on the other side.

FIG. 4 shows how the vehicle is supported by a jack head 69a on a jack stand 69 under the axle 40. The uninflated tire 38 is partially compressed against the ground so that it better matches the fit of an actual tire on an actual rim.

Figure 14A:
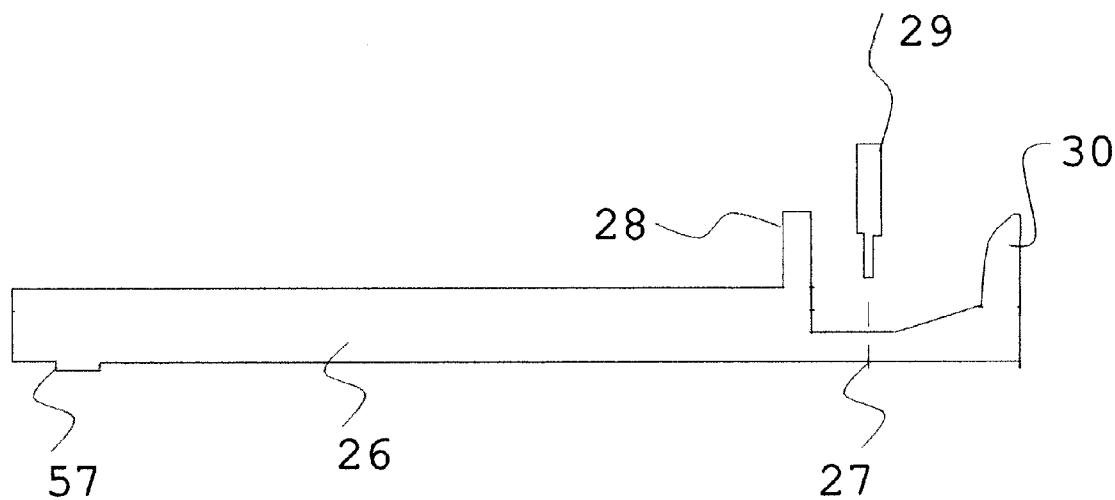

In order to have different tire sizes held within these grips either a multitude of various width spacers is necessary or, as shown in the preferred embodiment, an expandable tire holding device is used which is comprised of a bottom expanding arm 31 (FIGS. 12a, b & c) which is adjustable relative to a top expanding arm 26 (FIGS. 14a, b & c). The two are locked together by way of a bolt 35 tightened by a wing nut 34 within a top expanding arm groove 45 and a bottom expanding arm groove 54. In order to better secure the spacing once determined along the two grooves there are cooperating interlocking teeth and grooves in the top expanding arm 26 and bottom expanding arm 31. (The tooth 57 on the top expanding arm fits within grooves 33 of the bottom expanding arm.) In order to hold the tire a tire holding arrangement of this type is referred to generally as the tire holding mechanism 61 at the top and 62 at the bottom.

Figure 8:
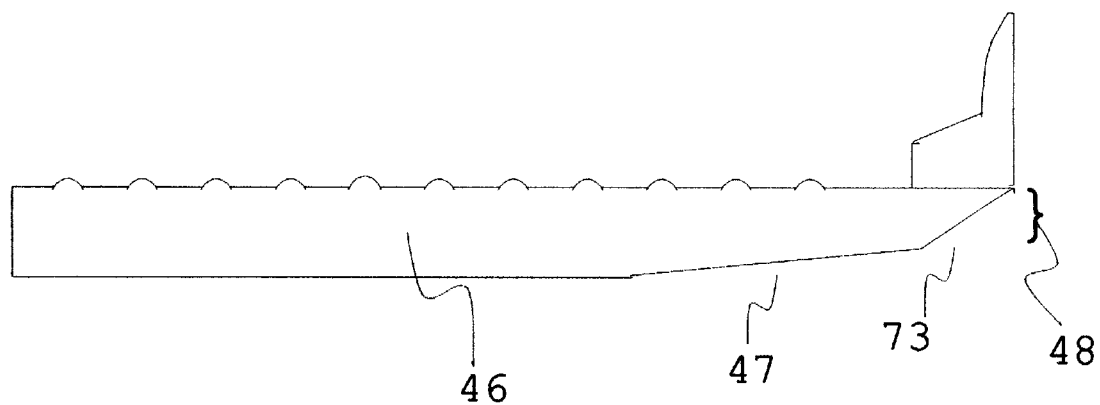
FIG. 8 shows an alternative design of the bottom half horizontal extension.
Figure 12A:
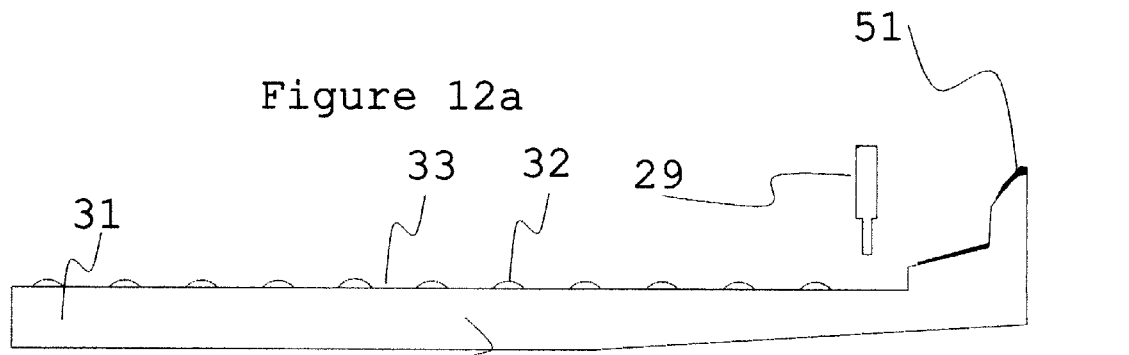
Figure 12B:
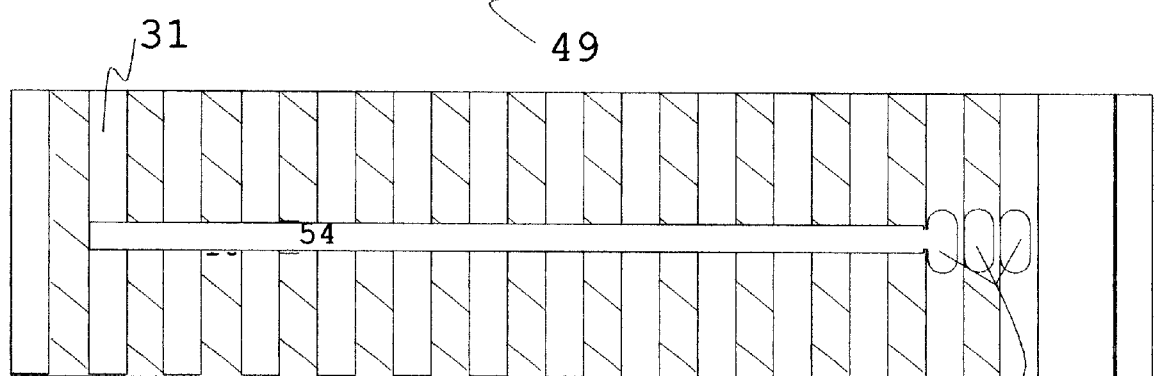
Figure 12C:
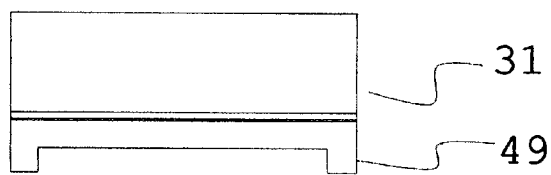

FIGS. 12a–12c show an alternate of the bottom expanding arm. This arm has rounded teeth 32. FIG. 8 shows yet another modification where edge 73 is rounded to provide more clearance. Also, there are legs 49 which are beveled as they approach the clamping edge in order to keep the expansion plates aligned with the vertical expanding arm 43 and 44. The legs 49 are beveled to help keep them from interfering with the steering rod. The bevel also gives this part greater resistance to bending.

Figure 14B:
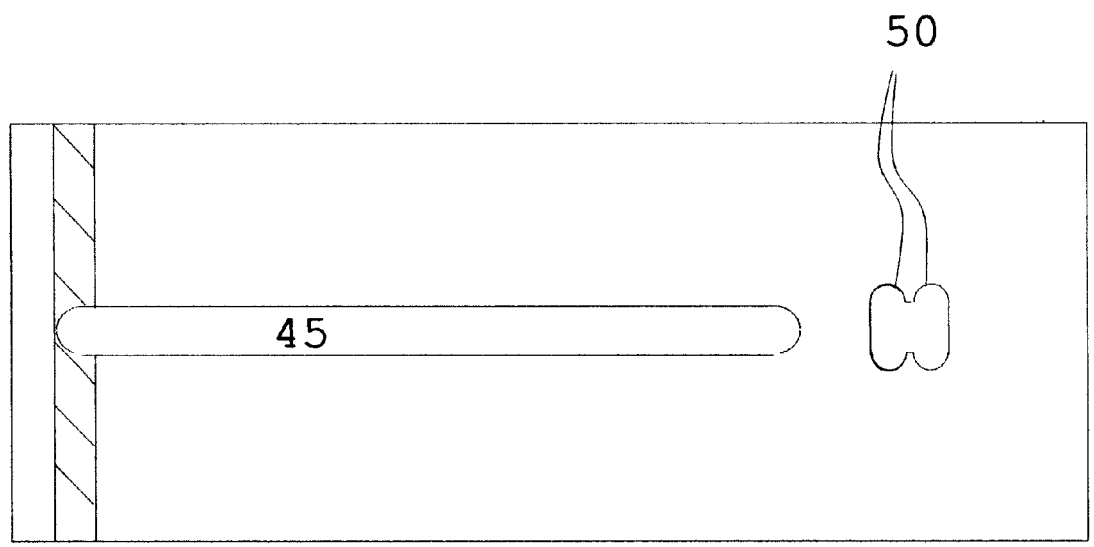
Figure 14C:
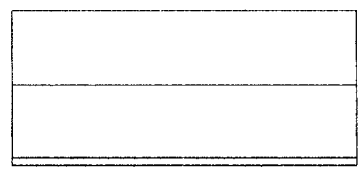

In FIGS. 12a–12c, there are holes 27 to receive a movable inside tire grip 29. It is movable to accommodate a greater variety of tire beads. The same arrangement is shown in the alternate embodiment of the top expanding arm shown in FIGS. 14a–14c. A secondary reinforcing wall 28 is shown to help support the inside tire grip 52 in this figure. As can be seen, there is only a single tooth 57 in this embodiment.

A detail view of the removable inside tire grip 52 is shown in FIGS. 15a–15c. As can be seen by reference to FIG. 15c, there is a small bolt hole 75 in tab 76 to secure the grip 52 in place.

In order to maintain the spacing of the tire holding mechanisms 61 and 62 these are held apart by a spacing means 63 which is attached to the axle 40. This means comprises a face plate 1 which defines a center bore hole 2. A first lug opening 13 at a predetermined first angle 4 to a second lug opening 3 is designed so that the center bore opening may fit over the axle 40 so that the lug bolts 42 and 41 fit within the first lug opening 13 and each subsequent lug opening as needed by the specific vehicle.

Because different vehicles have different lug pattern openings, first alternate angle leads to a first alternate second lug opening 64 in the plate which can best be seen by reference to FIG. 4. The lug openings 6, 7, 8, 9, 10, 11 and 12 provide for different bolt patterns that would fit this plate and an alternate plate with alternate plate openings and alternate lug openings as shown In FIG. 2. The angles shown in FIG. 1 and the angels shown in FIG. 2 both are the first angles 4 and at least one alternate angles 5 so that this may be used with most lug nut arrangements and most vehicles.

FIGS. 9a–11a shows alternate embodiments of the main plates 1 and 2. In these embodiments, the non-functioning edges of the face plates have been cut away to make softer edges and to prevent the plates from interfering with the brake calipers and other parts in the tire well. In these embodiments, there are different lug arrangements to allow for more lug bolt arrangements as shown in the figures.

Figure 9A:
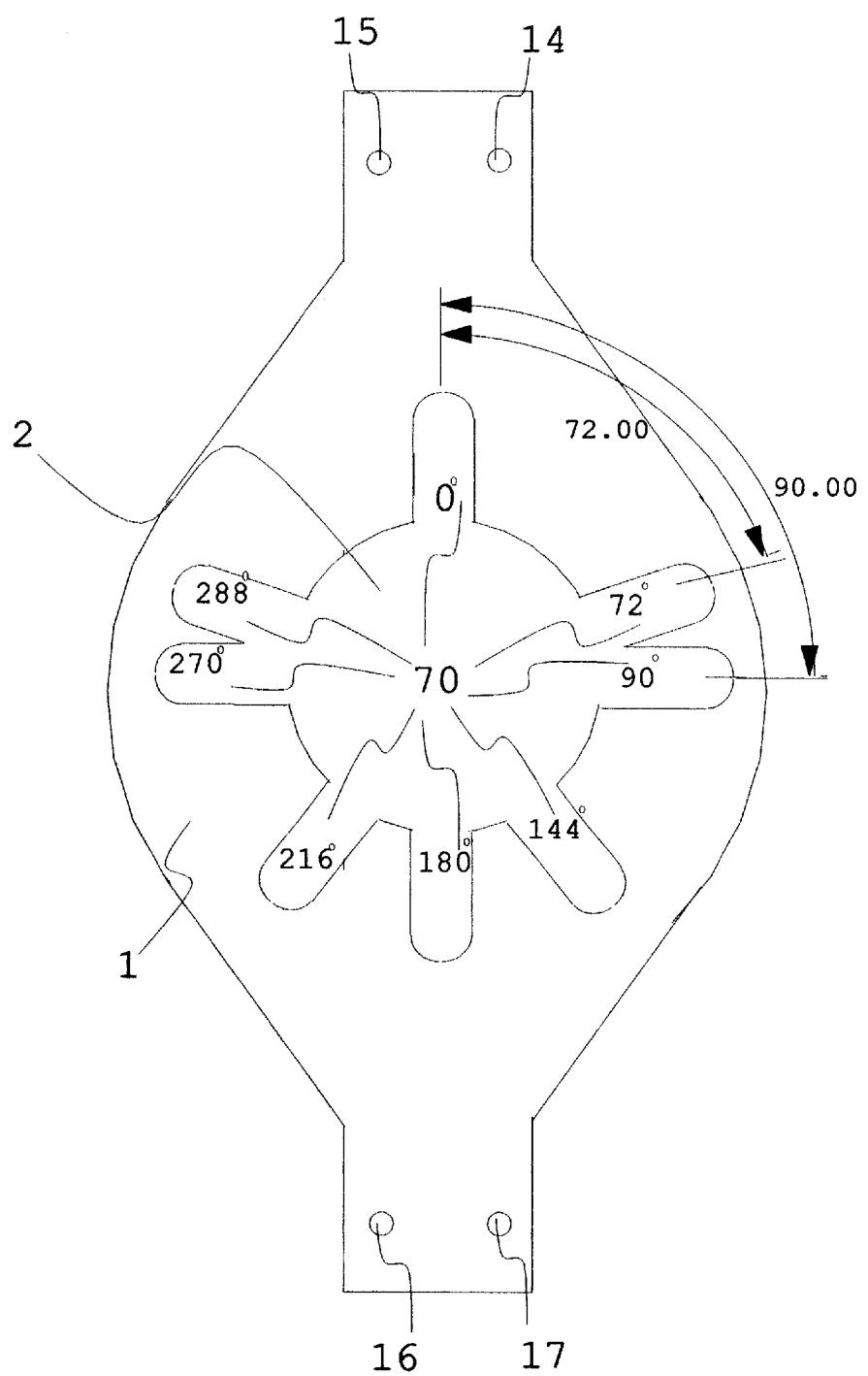
FIG. 9a shows an alternate embodiment of the first of three face plates.
Figure 9B:
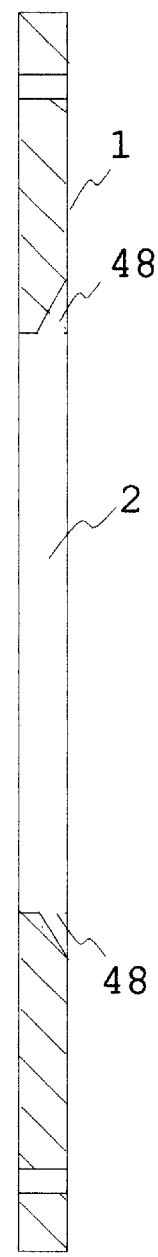
Figures 10A, 10B:
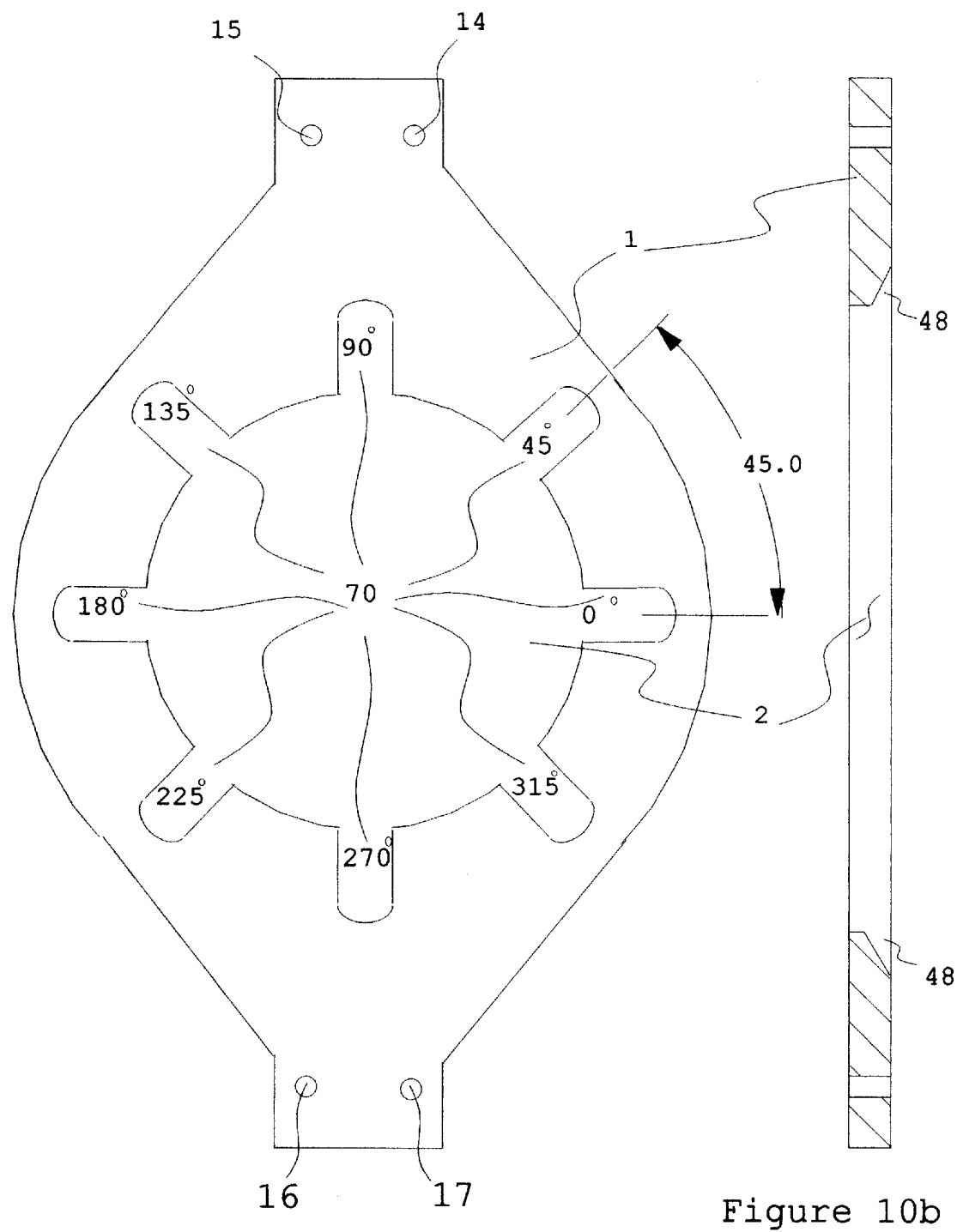
Figures 11A, 11B:
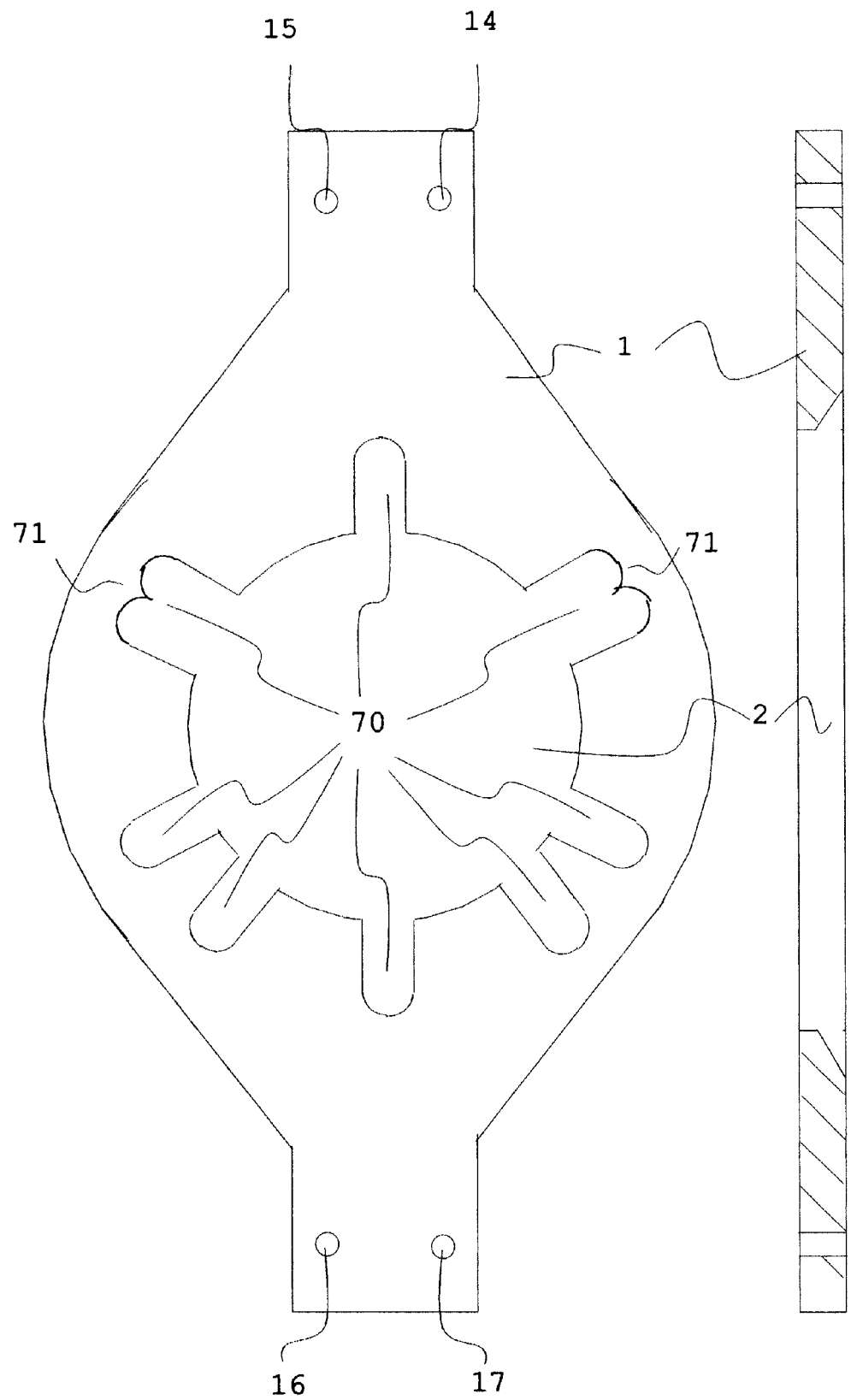

In FIG. 9a, the layout for openings 70 for a variety of lug bolts is 0, 72, 90, 144, 180, 316, 270 and 288 degrees. In FIG. 10a the layout for lug bolts is 0, 45, 90, 135, 180, 225, 270 and 315 degrees. In FIG. 11 the layout for lug bolts is 0, 60 and 72 in a common groove, 120, 144, 180, 216, 240 and 288 with 300 in a common groove. Where a common groove is cut for lug bolts, there is a small separating inclusion 71 within the common groove to help prevent the lug bolts from slipping when the face plate is fixed in place.

Another improvement in these face plates is the 60 degree bevel 48 on one side only where the lug bolt openings 70 receive lug nuts. The purpose of this bevel 48 is to provide rounded openings for acorn style lug nuts. The flat alternate face opposite this bevel 48 is to accommodate mag type lug nuts.

Figures 1A, 1B:
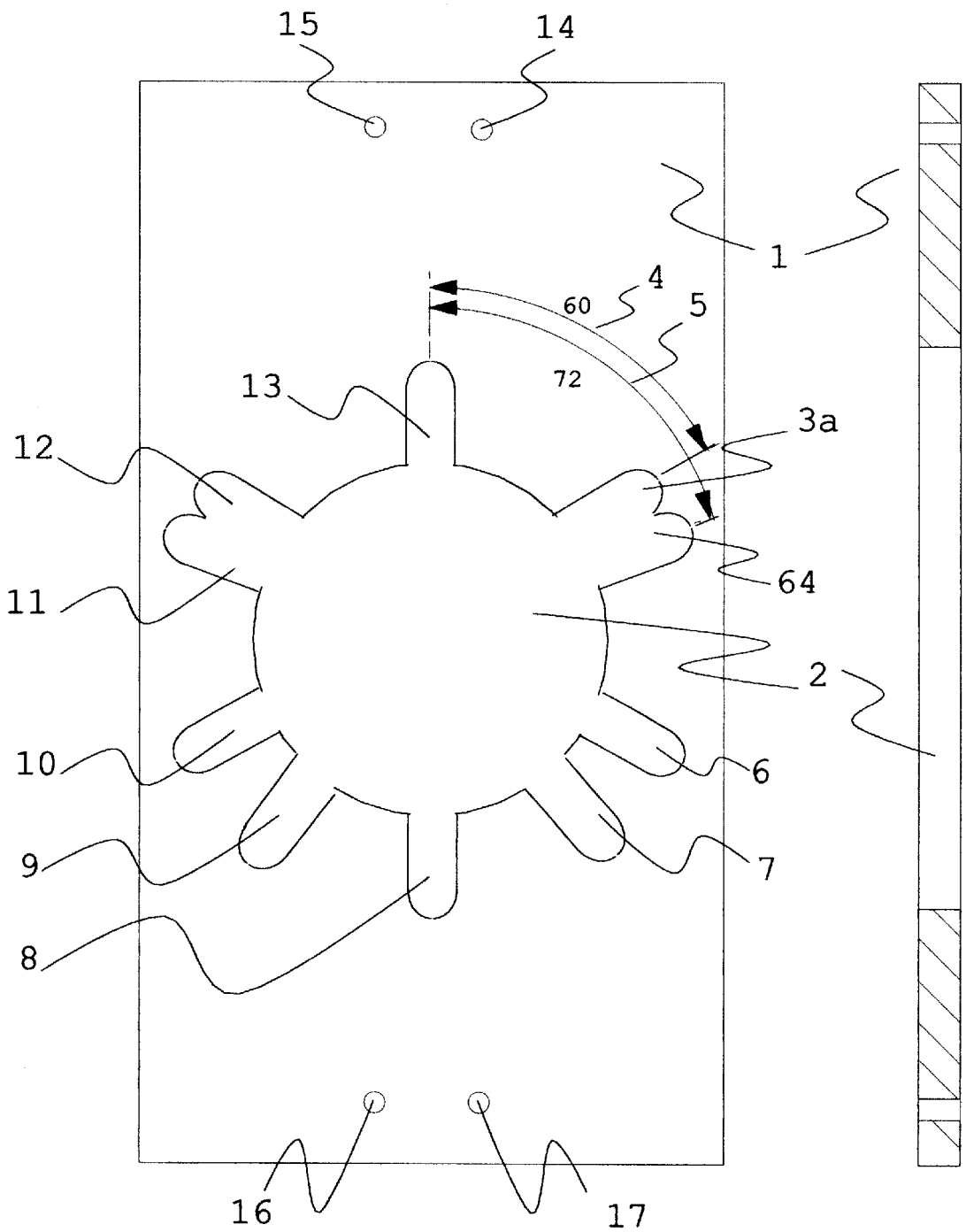
Figures 2A, 2B:
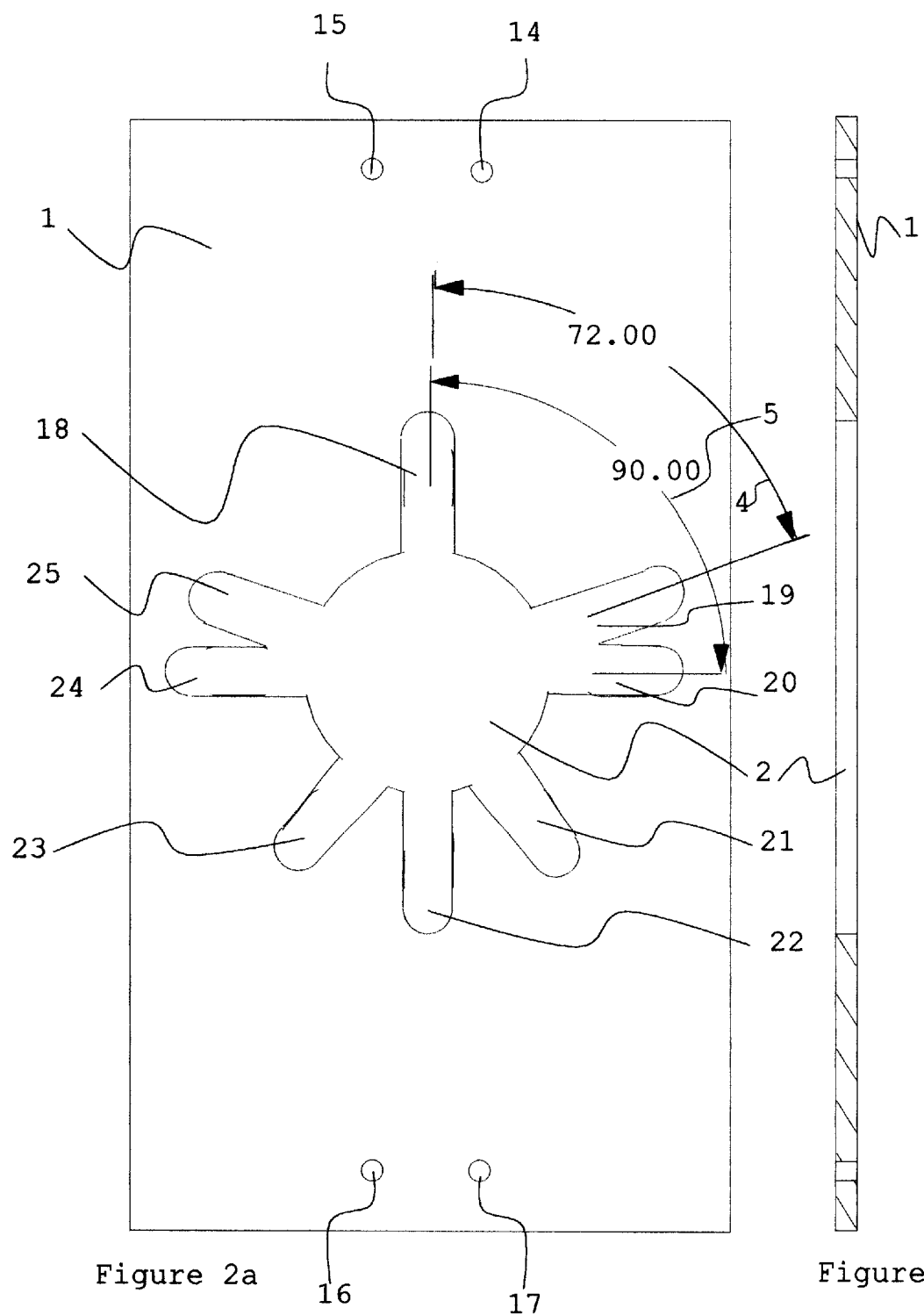

Just as multiple plates are shown in FIGS. 1 and 2 (or alternatively in FIGS. 9–11) so too could multiple spacing arrangements be used in place of the combination shown as 61 and 62 in FIG. 4. Once the plate is in place over the lug bolts 41 and 42, lug nuts 65 and 66 may be put in place in order to secure the face plate 1 to the axle 40. While the axle 40 of the vehicle is preferably used, FIG. 4 shows two lug bolts and two lug nuts since the test can be performed as long as a tire 38 is approximately secured in place.

The remainder of the adjustment mechanism is described as having cooperating openings on the main plate 1 and a top expansion plate 43 and a bottom expansion plate 44 on the top and bottom of the main plate.

Figures 13A, 13B:
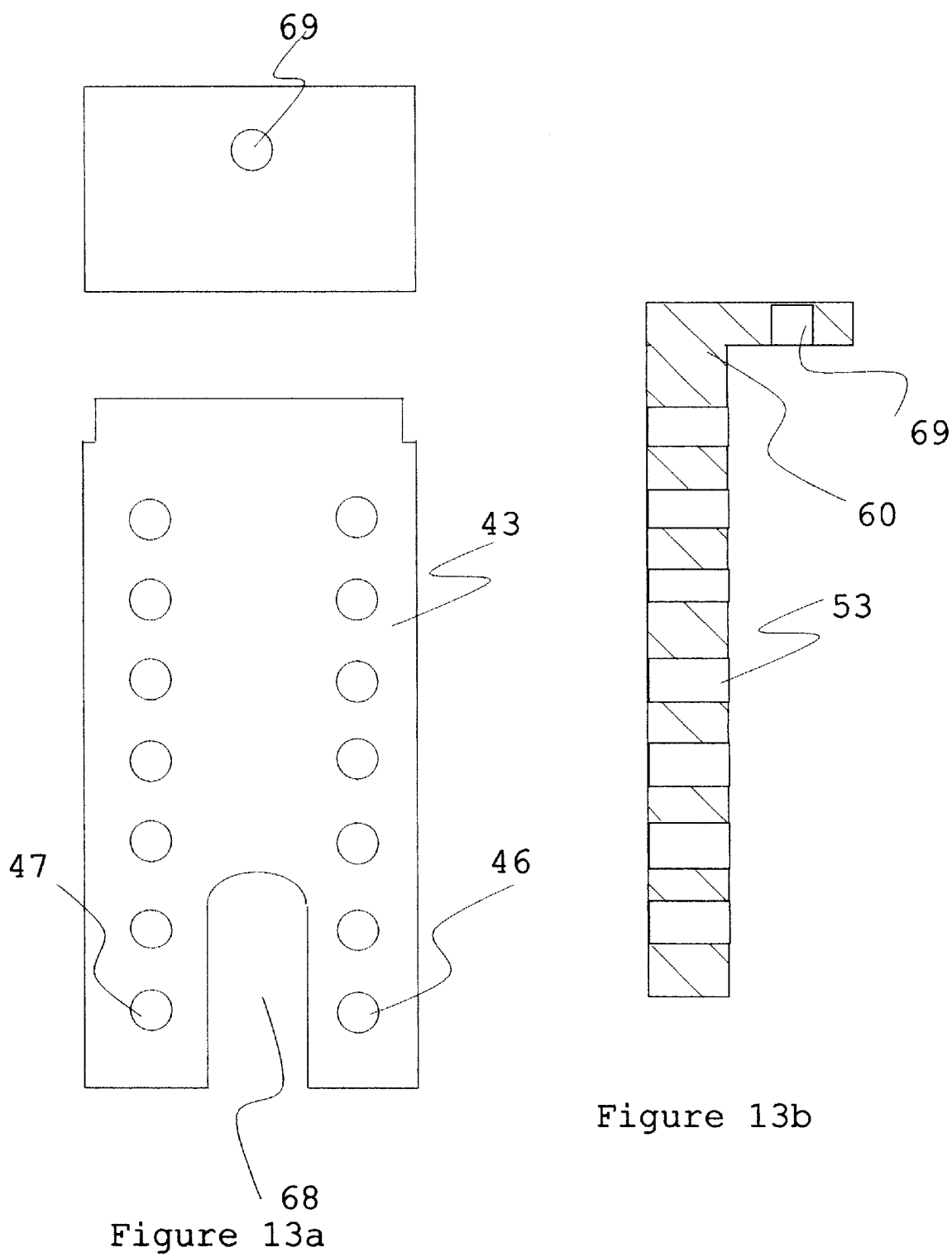

Alternate embodiments of the expansion plates shown in FIGS. 6a and 6b and 13a and 13b and 13c show an opening 68 in the extension plate to accommodate a lug bolt when the minimum size tire is used. As shown in FIGS. 13b and 13c there is a center hole 69 to connect the top and bottom tire expanding arms 26 and 31.

While a bolt and nut connecting the main plate to the expansion plate and the expanding arms to the top expansion plate are used, it is obvious that a number of methods of connecting these parts could be used including permanent welds, tack welds, clamps, bolts through parts extending outward, and the like. Like wise, similar securing clamps could be used in place of the bead holding means (inside and outside walls in the preferred embodiment), without departing from every inventive concept embodied herein. Also, while the top and bottom expanding arms are shown one over the other, it is obvious that one could be beside the other or one sliding within the other with the tire bead holding walls extending upward to accomplish a similar result to that taught herein.

Again, referring to FIG. 4 it can be seen that there are adjustment holes 53 in the top expansion plate 43 and bottom expansion plate 44. As can be seen by reference to FIG. 6 these adjustment holes 53 in the top expansion plate 43 and bottom expansion plate 44 are in parallel rows being a left hole row 47 and a right hole row 46. These holes 53 are preferably 0.50" apart which allows for most of the adjustment necessary for most tires that would be used with this fitting device. It can be seen by reference to FIGS. 1 and 2 that through the holes 53 can be aligned with a first top plate alignment opening 14 and second top plate alignment opening 15 respectively at the top of the face plate 1 and first bottom plate alignment opening 16 and second bottom plate alignment opening 17 at the bottom of the main plate 1 utilizing a bolt 36 and a wing nut 37 to secure those into place.

There are two bolts through openings on either side of expansion plates 43 and 44. These provide an alternate to teeth shown for the alignment of the top expanding arm 26 and bottom expanding tire arms 31 to maintain the proper attachment and alignment of the expansion plates 43 and 44 relative to the face plate 1.

To practice the invention the user selects a tire which they want to use on their vehicle and this tire 38 is measured so that the approximate spacing of the top expanding tire arm 26 and bottom expanding tire arm 31 is determined and the two tire holding expanding arms are adjusted so that the spacing between the inside tire grip 29 and outside tire grip 30 is at the desired distance from inside tire grip 52 and outside tire grip 51 on the bottom expanding tire arm 31 so that the bead 38a of the tire 38 is held on either side of the tire 38 on one or the other of these arms. Also the diameter of the tire is determined so that the spacing controlled by the distance of the top expansion plate 26 is properly spaced from top expansion plate on the opposite end 59 so that the spacing is approximately the same as the diameter of the tire 38 if the tire 38 is securely spaced and the expansion plates 43 and 44 are bolted in place as described above on the face plate 1. Then the tire is mounted to the assembly and the face plate is mounted within the vehicle tire well 39 on the axle 40. Then the user may determine, by turning the wheel left and right, whether this tire is going to fit on the vehicle prior to the time that the expensive rims and tires are ordered for the vehicle.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

I claim:

1. A tire holding device for aligning a tire, having a tire bead on outside and a tire bead on the inside of the tire within a tire well on the axle of a vehicle comprising:
   (1) a face plate means having a top, a bottom, a front and a back;
   (2) a face plate securing means for securing the face plate to the axle;
   (3) at least one top expansion means having a middle end having a length and an exterior end, said middle end being attachable along said it's length to the face plate for varying the length from the face plate to the exterior end of the at least one top expansion means;
   (4) an attachment means for holding the at least one top expansion means along its said length to the face plate; and
   (5) a tire holding means for holding the tire with the inside and outside tire bead expanded relative to the inside tire bead attached to the at least one top expansion means.

2. The invention of claim 1 further comprising:
   (a) at least one bottom expansion means having a middle end having a length and an exterior end, said middle end being attachable along the it's length to the face plate for varying the length from the face plate to the exterior end of the at least one bottom expansion means; and
   (b) an attachment means for holding the at least one bottom expansion means along its length to the at least one face plate; and
   (c) a tire holding means for holding the tire with the tire bead expanded attached to the at least one top expansion means.

3. The invention of claim 2 wherein the attachment means comprises at least one opening in the face plate and a plurality of matching openings along the length of the expansion plate wherein any of the openings in the expansion plate may receive a bolt through the opening of the face plate and matching opening to secure the face plate and expansion plate.

4. The invention of claim 1 wherein the face plate comprises a center bore hole having a plurality with lug openings for fitting at least one pattern of lug bolts.

5. The invention of claim 4 wherein the plurality of lug openings may fit a plurality of lug bolt patterns.

6. The invention of claim 4 further comprising at least one second face plate, substitutable for the first face plate for at least one second pattern of lug bolt.

7. The invention of claim 4 further comprising at least one third face place, substitutable for the first face plate for at least one second pattern of lug bolts.

8. The invention of claim 4 wherein the face plate further comprises a front side and a rear side and wherein the front side defines a bevel to receive acorn lug nuts along the beveling and the rear side is not beveled to accommodate mag lug nuts.

9. The invention of claim 2 wherein the tire holding means comprises at least one expanding arm means comprised of a top expanding arm means having a length, an arm connecting means for connecting the top expanding arm means to the top expansion means, a bottom expanding arm having a length, a second arm connecting means for connecting the top expanding arm means to the bottom expanding arm means at a plurality of locations along the length of the bottom expanding means and an outside tire grip means for holding the outside tire bead attached to the bottom tire holding means and an inside tire grip means for holding the inside tire bead attached to the top tire holding means.

10. The invention of claim 9 wherein top expansion means and bottom expansion means define a bolt hole and further comprises a bolt and nut means for securing the bolt opening and wherein the arm connecting means and second arm connecting means comprises the bolt running through the bolt opening of the top expansion means, through the top expanding arm means and through the bottom expanding arm means so that when the nut means is tightened on the bolt, the top expansion means, top expanding arm means and bottom expanding arm means are pressed together and a second bolt running through the bolt opening of the bottom expansion means, through a second top expanding arm means and through a second bottom expanding arm means so that when a second nut means is tightened on the bolt, the bottom expansion means, second top expanding arm means and second bottom expanding arm means are pressed together.

11. The invention of claim 10 wherein expansion means defines a width defining expansion means walls to the bottom expanding arm further comprises aligning walls on either side of the expansion means to secure the position of the bottom expanding arm relative to the expansion means walls.

12. The invention of claim 10 wherein the top expanding arm means and bottom expanding arm means further comprise at least one cooperating tooth and gap for securing their position against any pressure exerted by the tire bead when the tire bead is attached to the inside and outside tire holding means.

13. The invention of claim 10 wherein the tire holding means comprises an inside wall and an outside wall and a space defined between the inside wall and outside wall, said space for receiving the tire bead.

14. The invention of claim 12 wherein the size of the space is variable.

15. The invention of claim 4 wherein the face plate further comprises a shape minimizing the space utilized around the lug bolt pattern.

16. The invention of claim 10 wherein the space defined by the sides of the expansion arm means is minimized in order to prevent interference with the tire well.

17. A tire receiving means for receiving and holding a tire comprising:
   a) an inside bead holding means comprising an inside gripping means to grip either side of the bead comprising an inside tire grip and an outside tire grip respectively holding the inside and outside of the tire bead;
   b) an outside bead holding means comprising an inner and outer ridge holding the tire bead between the inner and outer ridge;
   c) an adjusting arm attached to the receiving means to allow the space between the inside bead holding means and outside bead holding means to be varied to one another;
   d) an extension means attached to the tire means for moving the adjusting arm outward from a car axle hub and a plate defining at least one opening for receiving a wheel hub and said plate further defining at least one lug opening for receiving a lug bolt so that when the plate is aligned on the axle, lug nuts may secure the plate on to the lug bolts.

* * * * *